United States Patent [19]
Sugai et al.

[11] Patent Number: 5,497,328
[45] Date of Patent: Mar. 5, 1996

[54] DEVICE FOR DETECTING CONTINUOUS MISFIRES OF A MULTI-CYLINDER INTERNAL COMBUSTION ENGINE

[75] Inventors: Masakazu Sugai; Akira Demizu, both of Himeji, Japan

[73] Assignee: Mitsubishi Denki Kabushiki Kaisha, Tokyo, Japan

[21] Appl. No.: 138,058

[22] Filed: Oct. 19, 1993

[30] Foreign Application Priority Data

Oct. 20, 1992 [JP] Japan .................... 4-281593

[51] Int. Cl.⁶ .................... G06F 19/00; F02P 5/14; G01L 3/26
[52] U.S. Cl. .................... 364/431.03; 364/431.07; 364/431.08; 73/117.3; 73/116; 123/425; 123/435; 123/617; 123/494; 60/274
[58] Field of Search .................... 364/431.01–431.12, 364/511; 73/117.3, 116, 112; 123/425, 435, 479, 481, 630, 415, 418, 416, 417, 617, 494, 90.13, 90.12, 419; 60/274, 278

[56] References Cited

U.S. PATENT DOCUMENTS

| | | | |
|---|---|---|---|
| 4,009,695 | 3/1977 | Ule | 364/511 |
| 4,009,697 | 3/1977 | Chateau | 364/511 |
| 5,105,657 | 4/1992 | Nakaniwa | 73/117.3 |
| 5,197,325 | 3/1993 | Tamura et al. | 73/117.3 |
| 5,251,138 | 10/1993 | Katayama | 364/426.04 |
| 5,278,760 | 1/1994 | Ribbens et al. | 364/431.07 |
| 5,287,282 | 2/1994 | Imai | 364/431.08 |
| 5,307,670 | 5/1994 | Imai et al. | 73/117.3 |
| 5,331,848 | 7/1994 | Nakagawa et al. | 73/116 |
| 5,353,636 | 10/1994 | Sakurai et al. | 73/117.3 |
| 5,359,518 | 10/1994 | Wimmer | 364/431.03 |
| 5,379,634 | 1/1995 | Kuroda et al. | 73/116 |
| 5,381,689 | 1/1995 | Ishida | 73/116 |

*Primary Examiner*—Kevin J. Teska
*Assistant Examiner*—Jacques H. Louis-Jacques
*Attorney, Agent, or Firm*—Sughrue, Mion, Zinn, Macpeak & Seas

[57] ABSTRACT

A misfire detection device for a multi-cylinder internal combustion engine detects levels of angular acceleration β of the crankshaft corresponding to predetermined phase intervals of respective cylinders. Further, the differences Δβ between the levels of angular acceleration corresponding to successively ignited cylinders are calculated as the combustion condition parameters corresponding to respective cylinders, and when the absolute variance ΔβR of the levels of combustion condition parameter (i.e., difference of acceleration Δβ) corresponding to cylinders whose ignition timings are separated by 360 degrees of the crank angle is continuously less than a predetermined judgment level, an occurrence of continuous misfires is detected.

6 Claims, 7 Drawing Sheets

DEVICE FOR DETECTING CONTINUOUS MISFIRES OF A MULTI-CYLINDER INTERNAL COMBUSTION ENGINE

BACKGROUND OF THE INVENTION

This invention relates to misfire detection devices for detecting misfires of internal combustion engines, and more particularly to misfire detection devices for detecting the misfires occurring continuously in the cylinders of multi-cylinder internal combustion engines.

A conventional misfire detection device for an internal combustion engine is disclosed, for example, in Japanese Laid-Open Patent (Kokai) No. 2-414000. The misfire detection device detects the rotation of the internal combustion engine by means of a crank angle sensor, and determines an occurrence of misfire on the basis of the variation in the rotational speed of the internal combustion engine caused by the misfire. Namely, the ratio of the times required by the rotation of the crankshaft to complete predetermined angles before and after a predetermined crank angle is determined. Further, the acceleration of the time ratio is determined and an occurrence of misfire is detected when the acceleration of the time ratio exceeds a predetermined level.

According to the above misfire detection device, the misfire is detected on the basis of the acceleration of the time ratio corresponding to a single cylinder. Thus, if the state of the misfire changes and the cylinder is normally operating in a first cycle and misfiring in a second cycle, the acceleration obtained for the first cycle and that obtained for the second cycle are distinct, and hence the occurrence of misfire can be detected reliably. If, however, the cylinder is continuously misfiring in both the first and second cycles, the difference between the acceleration becomes negligibly small, such that the detection of the occurrence of misfire becomes difficult. The detection of occurrences of misfire may thus become inaccurate and unreliable.

SUMMARY OF THE INVENTION

It is therefore an object of this invention to provide a misfire detection device for detecting an occurrence of misfire of an internal combustion engine, by which the continuously occurring misfires can be detected reliably and accurately.

The above object is accomplished in accordance with the principle of this invention by a device for detecting continuous misfires of a multi-cylinder internal combustion engine, which comprises: crank angle detector means for detecting predetermined crank angles of the internal combustion engine corresponding to predetermined phase angles of cylinders of the internal combustion engine; timer means, coupled to the crank angle detector means, for determining lengths of time between the predetermined crank angles of the internal combustion engine; angular acceleration detector means, coupled to the timer means, for determining angular acceleration of a crankshaft of the internal combustion engine over predetermined phase intervals of the cylinders; combustion condition parameter determiner means, coupled to the angular acceleration detector means, for determining combustion condition parameters corresponding to respective cylinders on the basis of levels of the angular acceleration of the crankshaft over predetermined phase intervals of the cylinders; variance determiner means, coupled to the combustion condition parameter determiner means, for determining a variance of levels of the combustion condition parameters over two cylinders ignition timings of which are separated by a predetermined crank angle; and comparator means, coupled to the variance determiner means, for comparing the variance with predetermined misfire judgment reference level, the comparator means detecting an occurrence of continuous misfires when the variance is less than the misfire judgment reference level.

Preferably, the combustion condition parameter determiner means comprises: difference of acceleration determiner means for determining a difference between levels of the angular acceleration corresponding to two successively ignited cylinders, wherein the combustion condition parameter corresponding to each cylinder is the difference of levels between the angular acceleration corresponding to the each cylinder and a cylinder ignited immediately before the each cylinder. It is further preferred that the variance determiner means determines the variance of levels of the combustion condition parameters corresponding to cylinders ignition timings of which are separated by 360 degrees of crank angle. Still further, it is preferred that the comparator means compares the variance with the predetermined misfire judgment reference level for a predetermined number of times, the comparator means detecting an occurrence of continuous misfires when the variance is continuously less than the misfire judgment reference level for the predetermined number of times.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 3c shows the variation of the angular velocity $\omega$ corresponding to the variation of the cylinder pressures shown in FIG. 3a;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
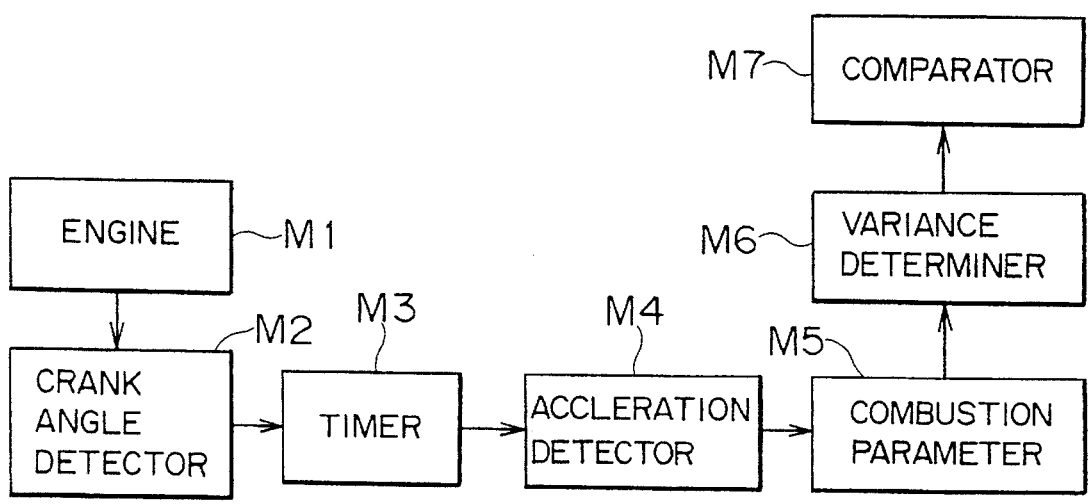
FIG. 1 is a block diagram showing the functional structure of a misfire detection device for an internal combustion engine according to this invention.

FIG. 1 is a block diagram showing the functional structure of a misfire detection device for an internal combustion engine according to this invention. To an engine or internal combustion engine M1 having a plurality of cylinders is mounted a crank angle detector means M2, which outputs a pulse signal indicating predetermined crank angles corresponding to predetermined phase angles of the cylinders of the engine (i.e., predetermined crank angles before the top dead center between the compression and the expansion stroke of respective cylinders). Timer means M3, coupled to the crank angle detector means M2, determines the lengths of time between the predetermined crank angles. Further, angular acceleration detector means M4, coupled to the timer means M3, determines the angular acceleration β of the crankshaft over predetermined phase intervals of the cylinders. Furthermore, combustion condition parameter determiner means M5, coupled to the angular acceleration detector means M4, determines the combustion condition parameters (e.g., the difference of acceleration Δβ) corresponding to respective cylinders on the basis of the levels of the angular acceleration of the crankshaft over predetermined phase intervals of the cylinders. Variance determiner means M6, coupled to the combustion condition parameter determiner means M5, determines the variance of the levels of the combustion condition parameters corresponding to cylinders whose ignition timings are separated by a predetermined crank angle (360 degrees). Finally, comparator means M7, coupled to the variance determiner means M6, compares the variance with predetermined misfire judgment reference level, and the comparator means detects an occurrence of continuous misfires when the variance is less than the misfire judgment reference level.

Figure 2:
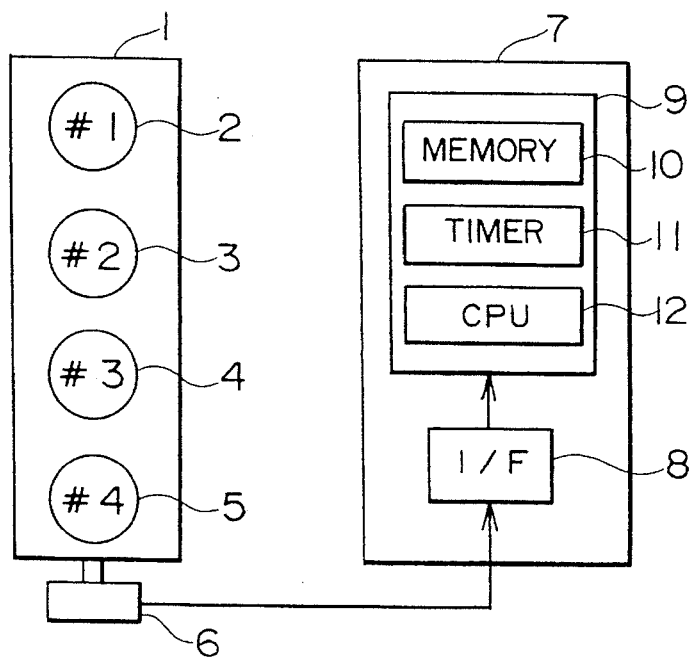
FIG. 2 is a block diagram showing the structure implementing the misfire detection device of FIG. 1.

FIG. 2 is a block diagram showing the structure implementing the misfire detection device of FIG. 1. Mounted upon the crankshaft or the cam shaft of a four-cycle engine 1 having four cylinders (Nos. 1 through 4) 2 through 5 is a crank angle sensor 6, which outputs a cylinder discrimination signal and an ignition period signal generated at respective reference crank angles that are separated, for example, by 180 degrees from each other. FIG. 3b shows the waveforms of the cylinder discrimination signal (curve A) and the ignition period signal (curve B) generated by the crank angle sensor 6 of FIG. 2. The crank angle sensor 6 includes a disk-shaped rotor (not shown) mounted on the crank angle or the cam shaft of the engine 1. The rotor is divided into two segments: one segment corresponding to predetermined two cylinders (e.g., the cylinders No. 1 and 4) having a predetermined phase difference (e.g., 360 degrees), and the other segment corresponding to the other two cylinders (e.g., the cylinders No. 2 and 3) having the same predetermined phase difference.

The misfire detector unit 7 first determines the angular acceleration of the crankshaft of the engine on the basis of the lengths of time required by the crankshaft to rotate over predetermined crank angles corresponding to respective cylinders. On the basis of the angular acceleration thus determined, the misfire detector unit 7 detects the misfires including those occurring continuously in respective cylinders. A misfire detector unit 7 includes a microcomputer 9 which receives the output of the crank angle sensor 6 through an interface 8. The microcomputer 9 includes: a memory 10 for storing the program steps and the control information which are necessary for executing the procedure as described below; a timer 11 consisting of a free-running counter counted up at each clock pulse generated at each predetermined period; and a CPU 12 which executes the misfire detection procedure as described below.

Next, the operation of the misfire detection device of FIG. 2 is described.

Figure 3A:
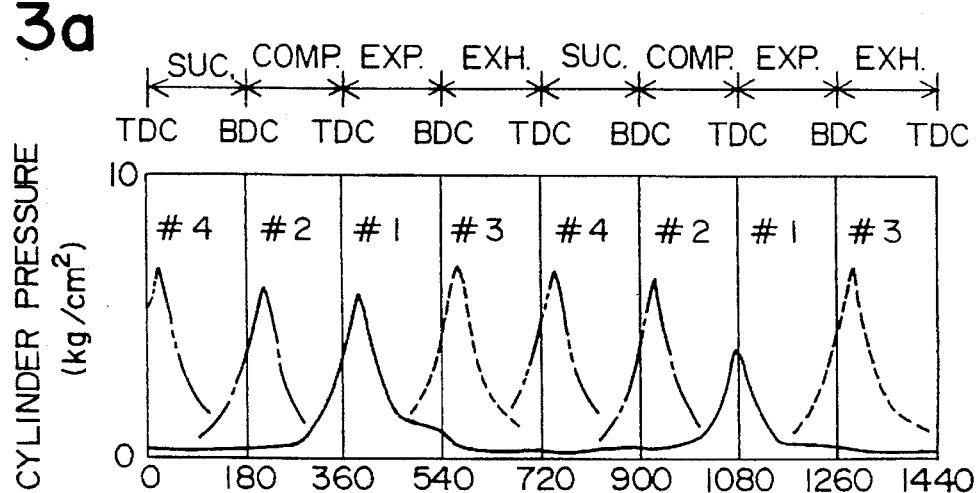
FIG. 3a is a diagram showing the sequence of the four strokes (suction, compression, expansion, and exhaust) of cylinder No. 1 of the engine (the line at the top), together with the variation of the cylinder pressures of cylinders No. 1 through 4.
Figure 3B:
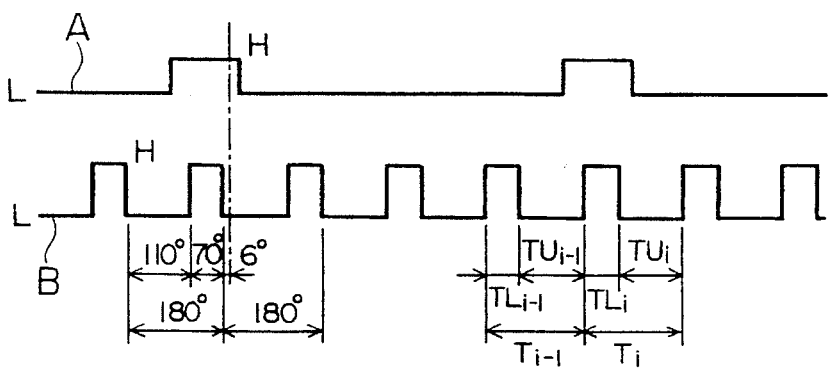
FIG. 3b shows the waveforms of the cylinder discrimination signal (curve A) and the ignition period signal (curve B) generated by the crank angle sensor 6 of FIG. 2.

FIG. 3a is a diagram showing the sequence of the four strokes (suction, compression, expansion, and exhaust) of cylinder No. 1 of the engine (the line at the top), together with the variation of the cylinder pressures of cylinders No. 1 through 4. The solid curve shows the variation of the inner pressure of cylinder No. 1. The dot-and-dash curve, the dotted curve, and the two-dots-and-dash curve respectively show the the variation of the inner pressure of cylinder Nos. 2, 3 and 4, in the neighborhood of the ignition timings of respective cylinders. The division into the four strokes (suction, compression, expansion, and exhaust) of respective cylinders is marked by the top dead center (TDC) and the bottom dead center (BDC) thereof (see the top line of FIG. 3a). The cylinder No. 1, for example, is ignited near the top dead center (TDC) at 360 degrees, and then again near the TDC at 1080 degrees of the crank angle. The ignition of cylinder Nos. 1, 3, 4 and 2 are successively retarded by 180 degrees in that order.

FIG. 3b shows the waveforms of the cylinder discrimination signal (curve A) and the ignition period signal (curve B) generated by the crank angle sensor 6 of FIG. 2. The ignition period signal B consists of pulses generated at each 180 degrees of the crank angle. Each pulse repetition period corresponding to 180 degrees of the crank angle consists of the low level (L) interval corresponding to 110 degrees and the high level (H) interval corresponding to 70 degrees. The trailing edges of successive pulses correspond to a predetermined angle (e.g., 6 degrees) before the top dead center at the beginning of the expansion stroke of respective cylinders. The cylinder discrimination pulse A is generated in overlap with each pulse of the ignition period signal B corresponding to the cylinder No. 1. The cylinder discrimination signal A thus distinguishes the pulses of the ignition period signal B corresponding to the cylinder No. 1.

The current supply to the ignition coil (not shown) of the internal combustion engine is controlled on the basis of the ignition period signal B. For example, to supply the ignition voltage to the cylinder No. 1 near the TDC at 360 degrees, the current supply to the ignition coil is started as the ignition period signal B rises to the high level H during the compression stroke between 180 and 360 degrees. As the ignition period signal B falls from the high level H to the low level L at the ignition timing near the TDC, the exact timing being determined in accordance with the rpm load of the engines, the current supply to the ignition coil is interrupted. The resulting high voltage is supplied to the ignition plug to ignite the cylinder. Thus, the inner pressure of the cylinder No. 1 rises sharply after the TDC at 360 degrees, to exert the driving force upon the piston and thereby to push it down during the expansion stroke between the 360 and 540 degrees. The cylinder Nos. 1, 3, 4 and 2 are ignited one after another, each ignition being successively retarded by the period of 180 degrees. The crankshaft of the internal combustion engine is thus driven and rotated.

Next, the method of detecting occurrences of misfire is described.

The waveform of the pressure within cylinder No. 1 of FIG. 3a near 360 degrees of the crank angle corresponds to the case of normal combustion. Namely, the air-fuel mixture taken into the cylinder during the suction stroke (from 0 to 180 degrees of the crank angle) is pressurized during the succeeding compression stroke (from 180 to 360 degrees of the crank angle) and is ignited near the top dead center at the end of the compression stroke. The combusting air-fuel mixture expands rapidly during the following expansion stroke (from 360 to 540 degrees of the crank angle), and the combusted fuel is exhausted during the exhaust stroke (from 540 to 720 degrees of the crank angle).

On the other hand, the waveform of the pressure of cylinder No. 1 of FIG. 3a near 1080 degrees of the crank angle corresponds to an occurrence of misfire due to the ignition failure or an inappropriate mixture ratio of the air and the fuel. The peak of the waveform of the pressure is substantially lower than the normal height thereof, and the waveform is substantially symmetric with respect to the top dead center at 1080 degrees if the misfire is complete (e.g., if no combustion of the air-fuel mixture takes place). If, on the other hand, the degree of misfire is slight, the waveform of the cylinder pressure during the expansion stroke takes the form intermediate between those of the normal waveform (the waveform from the 360 to 540 degrees) and the waveform corresponding to the complete misfire (the waveform from the 1080 to 1260 degrees).

Figure 3C:
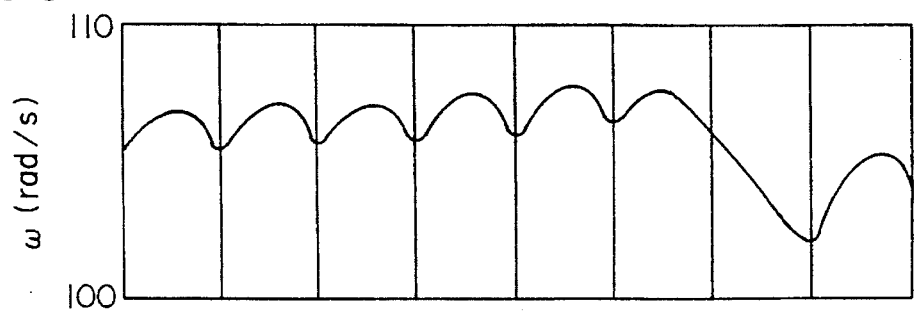

FIG. 3c shows the variation of the angular velocity ω corresponding to the variation of the cylinder pressures shown in FIG. 3a. The particular waveforms shown in FIGS. 3a and 3c are those obtained when the engine is rotated at 1000 rpm. When the respective cylinders are ignited normally, the angular velocity ω (rad/s) rises and falls periodically as the torque supplied by the combustion in respective cylinders increases and decreases, as shown over the crank angle from 0 to 1080 degrees. When, however, cylinder No. 1 misfires at 1080 degrees, for example, the normal torque is not supplied from the cylinder No. 1 to the crankshaft during the interval between 1080 and 1260 degrees of the crank angle. Thus the angular velocity 107 continues to decrease until the cylinder No. 3 is ignited. An occurrence of misfire thus causes a large variation in the angular velocity of the crank angle. Thus, in accordance with this invention, the acceleration of the angular velocity is calculated and occurrences of misfire are detected when the acceleration exceeds a predetermined level.

As shown in FIG. 3b, each pulse repetition period T (measured in seconds, corresponding to 180 degrees of the crank angle) of the ignition period signal B consists of the interval TU during which the ignition period signal B is at the low level L and the interval TL during which the ignition period signal B is at the high level H. Here, the suffix i and i−1 attached to T, TU and TL represent the current and the preceding values thereof.

Let $\omega i$ and $\omega i-1$ represent the angular velocities of the crankshaft during the current and the preceding period $Ti$ and $Ti-1$, respectively. Then, the angular acceleration $\alpha$ (rad/s$^2$) of the crankshaft is given by:

$$\alpha = (\omega i - \omega i-1)/Ti \quad (1)$$

The angular velocity ω (rad/s) is given by:

$$\omega i = (4\pi/c) \times (1/Ti) \quad (2)$$

where c represents the number of cylinders (i.e., 4 in the case of this embodiment).

If the polarity of the angular acceleration α is selected such that the sign thereof is positive when the angular velocity ωi decreases, then the angular acceleration α is given by the following equation:

$$\alpha = (4\pi/c) \times (1/Ti) \times [Ti/Ti^2 - \{Ti-1/(Ti-1)^2\}] \quad (3)$$

It is assumed that ΔTi is negligibly small compared with unity (ΔTi<<1), where ΔTi is defined by the equation:

$$Ti-1 = Ti + \Delta Ti$$

The angular acceleration α is thus approximated by the following equation:

$$\alpha = (4\pi/c) \times (Ti - Ti-1)/Ti^3 \quad (4)$$

Further, the period Ti is represented as the sum: Ti=TLi+TUi, where the first term TLi represents the information upon the amount of air contained in the cylinder during the compression stroke. Thus, the time ratio TUi/TLi corresponds to the normalized value of TUi, the normalization being performed with respect to the amount of air taken into the cylinder. If the amount of air taken into the successive cylinders remains constant, the relation TLi=TLi-1 holds. Then, the relation ΔTi=Ti-1−Ti=TUi-1−TUi holds, and the angular acceleration α is given by the equation:

$$\alpha = (4\pi/c) \times (TLi/Ti^3) \times \{TUi/TLi - (TUi-1/TLi-1)\} \quad (5)$$

The angular acceleration (1/s$^2$) is obtained by deleting the constant factor 4π/c from the above equation:

$$\alpha' = (TLi/Ti^3) \times \{TUi/TLi - (TUi-1/TLi-1)\}$$

which, according to this embodiment, is approximated by angular acceleration α (1/s$^2$):

$$\beta = (TLi/Ti-1^3) \times \{TUi/TLi - (TUi-1/TLi-1)\} \quad (6)$$

Figure 3D:
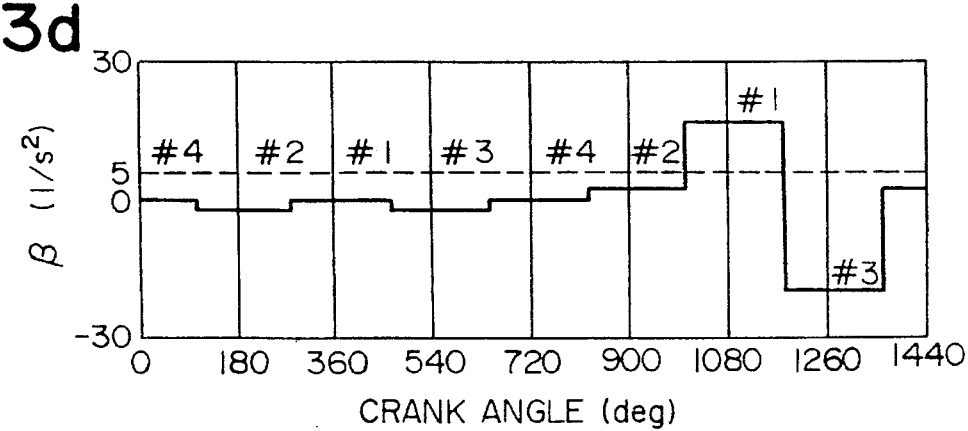
FIG. 3d is a diagram showing the angular acceleration $\beta$ ($1/s^2$) as determined from the angular velocity $\omega$ of FIG. 3c.

FIG. 3d is a diagram showing the angular acceleration β (1/s$^2$) as determined from the angular velocity ω of FIG. 3c.

Figure 4:
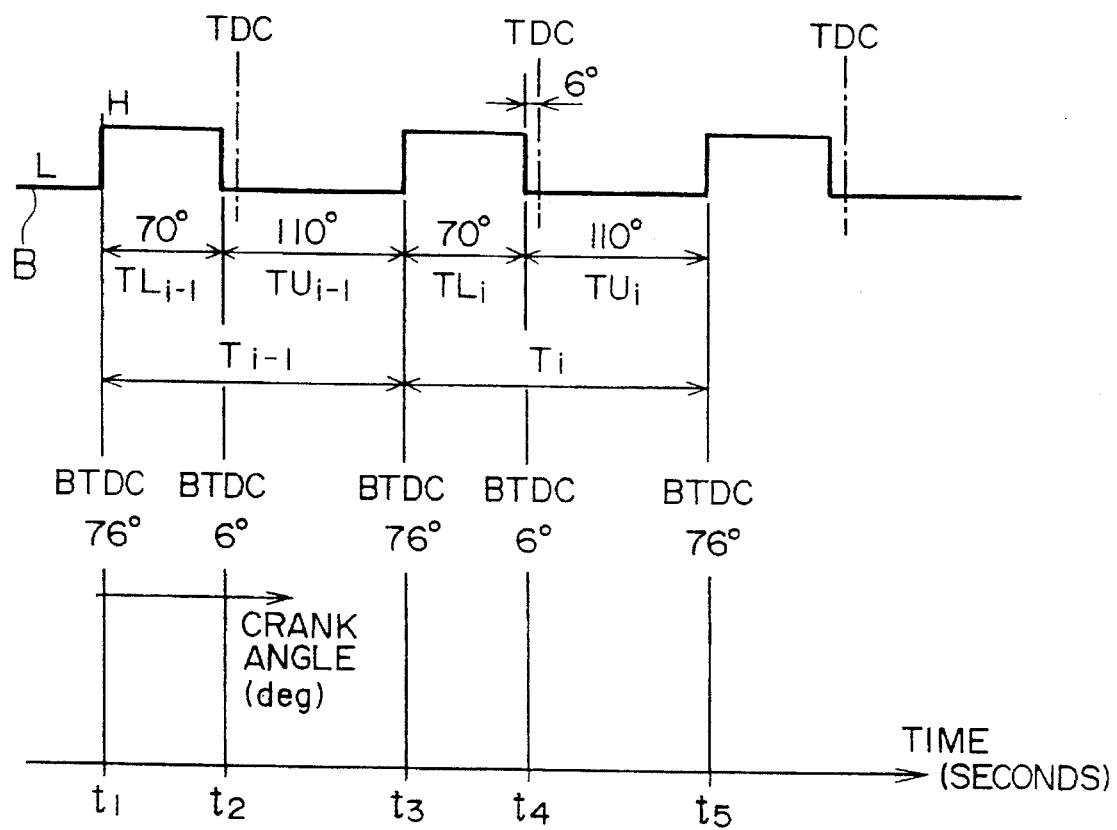
FIG. 4 is a detailed time chart showing the respective high and low level intervals of the ignition period signal B relative to the crank angle in degrees.

FIG. 4 is a detailed time chart showing the respective high and low level intervals of the ignition period signal B relative to the crank angle in degrees. Each time the crank angle reaches 76 degrees before the top dead center between the compression and the expansion stroke of a cylinder, the ignition period signal B rises from the low level L to the high level H and an interrupt is generated in the microcomputer 9 to execute the procedure of FIG. 5. Similarly, each time the crank angle reaches 6 degrees before the top dead center between the compression and the expansion stroke of a cylinder, the procedure of FIG. 6 is executed. It is assumed in the following description that the procedure of FIG. 5 is first executed at time point t1 in FIG. 4.

Figure 5:
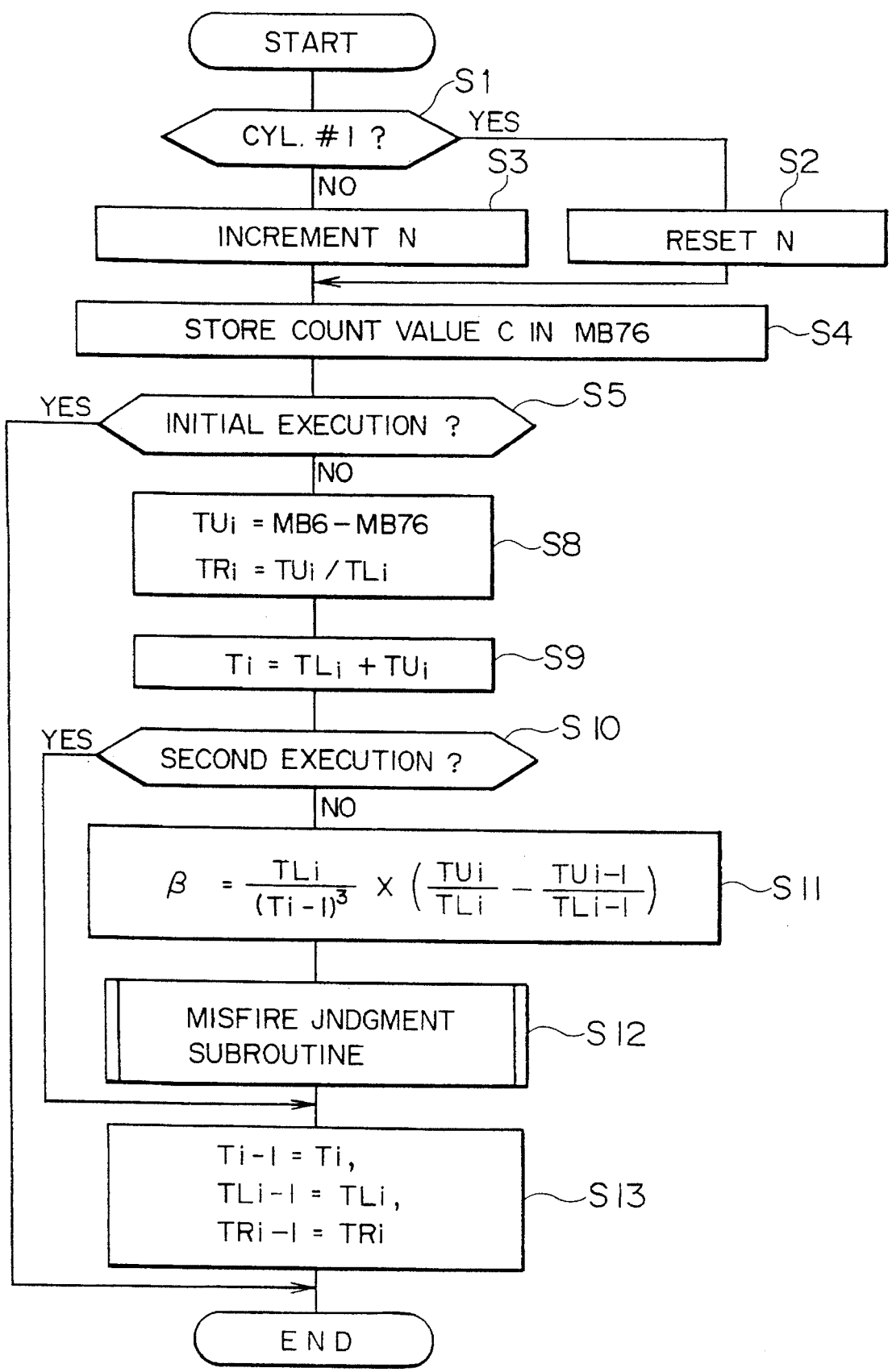
FIG. 5 is a flowchart showing the procedure followed by the misfire detection device of FIG. 2 for detecting occurrences of misfire.
Figure 6:
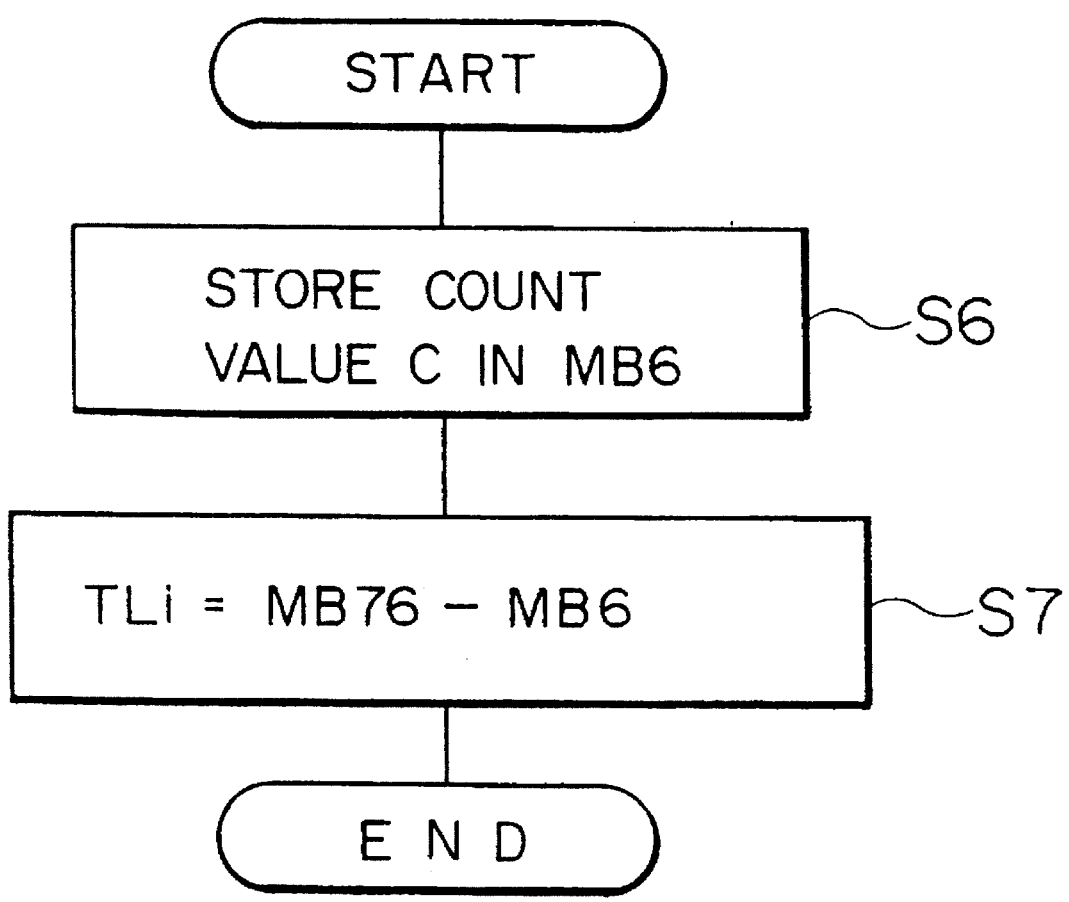
FIG. 6 is a flowchart showing the procedure which supplements the procedure of FIG. 5.

At step S1 in FIG. 5, the CPU 12 references the cylinder discrimination signal A of the crank angle sensor 6 (see FIG. 3b), so as to determine the cylinder number to which the current execution cycle of the procedure corresponds. The high level H of the cylinder discrimination signal A, occurring each 720 degrees of the crank angle, is generated in synchronism with (i.e., in overlapping relationship with) the high level H of the ignition period signal B which corresponds to the cylinder No. 1. Thus at step S1, the CPU 12 reads in the cylinder discrimination signal A and judges whether or not the cylinder discrimination signal A is at the high level H. If the cylinder discrimination signal is at the high level, it is determined that the cylinder is No. 1 and the execution proceeds to step S2, where the cylinder identification variable N stored in the cylinder counter in the memory 10 is reset to the number corresponding to the cylinder No. 1. Otherwise, the execution proceeds to step S3, where the cylinder identification variable N stored in the cylinder counter is incremented by 1 (i.e., N=N+1). As noted above, the procedure of FIG. 5 is executed each time the crank angle is 76 degrees before the top dead center at the beginning of the expansion stroke of respective cylinders. At steps S1 through S3, the cylinder identification variable N is thus updated each time the procedure of FIG. 5 is executed, such that the cylinder counter holds the cylinder identification variable N corresponding to the current cylinder. As described above the cylinder Nos. 1, 3, 4, 2 are ignited cyclically in that order. Thus, the values 1, 2, 3, 4 of cylinder identification variable N, for example, correspond to cylinder Nos. 1, 3, 4, 2, respectively.

After step S2 or step S3, the execution proceeds to step S4, where the CPU 12 reads in the count value C of the timer (timer counter) 11, which is counted up (i.e., incremented by 1) upon receiving a clock pulse generated at a predetermined clock period, and stores the count value C in the variable MB76 stored in the memory 10. The value C of the timer 11 corresponds to the current time, and hence the variable MB76 corresponds to the time at 76 degrees before the top dead center of the current cylinder. Next, the execution proceeds to step S5, where the CPU 12 references a flag X stored in the memory 10 and judges whether or not the current execution cycle is the initial or first execution of the procedure. The flag X is set at the commencement of the program implementing the procedures of FIGS. 5 and 6 stored in the memory 10, to show that the next execution cycle is the first execution. If the judgment is affirmative at step S5 (i.e., if the flag X is set), the flag X is reset and the execution is terminated, since the angular acceleration of the crankshaft cannot be determined in the first execution cycle of the procedure of FIG. 5.

After step S5 in FIG. 5, the CPU 12 halts the execution until the ignition period signal B falls to the low level L at 6 degrees before the top dead center between the compression and expansion stroke of the current cylinder (at time point t2 in FIG. 4). When the crank angle reaches 6 degrees before the top dead center, an interrupt is generated at the falling edge of the ignition period signal B, such that the procedure of FIG. 6 is started.

At step S6 in FIG. 6, the count value C is read out from the timer 11 and is stored in the variable MB6 in the memory 10. Next at step S7, the difference:

$$TLi=MB76-MB6 \quad (7)$$

is calculated and stored in a variable TLi in the memory 10, and the procedure of FIG. 6 is terminated. (As will become clear from the description below, the value TLi stored in the variable MB6 in the first execution cycle of FIG. 6 corresponds to the value TLi-1 in FIG. 4.)

When the crank angle again reaches 76 degrees before the top dead center between the compression and the expansion stroke of the next cylinder (at time point t3 in FIG. 4), the procedure of FIG. 5 is executed anew from step S1 onwards.

Thus, at steps S1 through S4, the cylinder counter N is updated to the number corresponding to the current cylinder. Further, at step S4, the value stored in the variable MB76 is updated. At step S5, the judgment is affirmative, since the flag X is cleared at the preceding execution cycle. Thus the execution proceeds to step S8, where the value in the variable MB6 (the value stored at step S7 in the immediately preceding execution of the procedure of FIG. 6) and the value stored in the variable MB76 (the value stored at step S4 in the current execution cycle of the procedure of FIG. 5) are referenced, and the length of time TUi (as described below, the value calculated in the first execution cycle corresponds to the length TUi-1 in FIG. 4) is calculated by the following equation:

$$TUi=MB6-MB76 \quad (8)$$

Further, the time ratio TRi is calculated by:

$$TRi=TUi/TLi \quad (9)$$

The value TRi is stored in a variable TRi in the memory 10.

Next at step S9, the length of time Ti (as described below, the value calculated in the first execution cycle corresponds to the length Ti-1 in FIG. 4) is calculated by the following equation:

$$Ti=TLi+TUi \quad (10)$$

The value Ti is stored in variable Ti in the memory 10.

Next at step S10, the CPU 12 references a flag Y in the memory 10 and judges whether or not the current execution cycle is the second execution of the procedure. The flag Y is set when the flag X is reset at step S5 in the first execution cycle. Thus, in the second execution cycle, the flag Y is set at step S5 and the judgment is affirmative at step S5. Thus, after clearing the flag Y, the execution proceeds to step S13, where the values of the variables Ti, TLi, and TRi (which are determined at the immediately preceding steps S9, S7, and S8, respectively) are assigned to (i.e., stored in) the variables Ti-1, TLi-1, and TRi-1, respectively, in the memory 10. The execution is terminated after step S13.

When the crankshaft is further rotated and the crank angle reaches 6 degrees before top dead center between the compression and the expansion stroke of the current cylinder (at time point $t_4$ in FIG. 4), the procedure of FIG. 6 is executed again. Thus at step S6, the count value C corresponding to the current time is stored in the variable MB6, and the value TLi is calculated with the above equation (7), and stored in the variable TLi.

Further, when the crank angle reaches 76 degrees before top dead center between the compression and the expansion stroke of the next cylinder (at time point $t_5$ in FIG. 4), the procedure of FIG. 5 is executed again. This is the third execution of the procedure of FIG. 5. The cylinder identification variable N is updated at steps S1 through S4. The judgment at step S5 is negative and the execution proceeds to steps S8 and S9, where the variables TUi, TRi, and Ti are calculated by the above equations (8), (9), and (10). The judgment at step S10 is negative since the flag Y is cleared and the execution proceeds to step S11, where the angular acceleration β of the crankshaft is calculated by the above equation (6), using the variables TLi, Ti-1, TRi, and TRi-1 stored in the memory 10, on the basis of the relation:

$$\beta = (TL_i/T_{i-1}^3) \times \{TU_i/TL_i - (TU_{i-1}/TL_{i-1})\}$$
$$= (TL_i/T_{i-1}^3) \times (TR_i - TR_{i-1})$$

Figure 7:
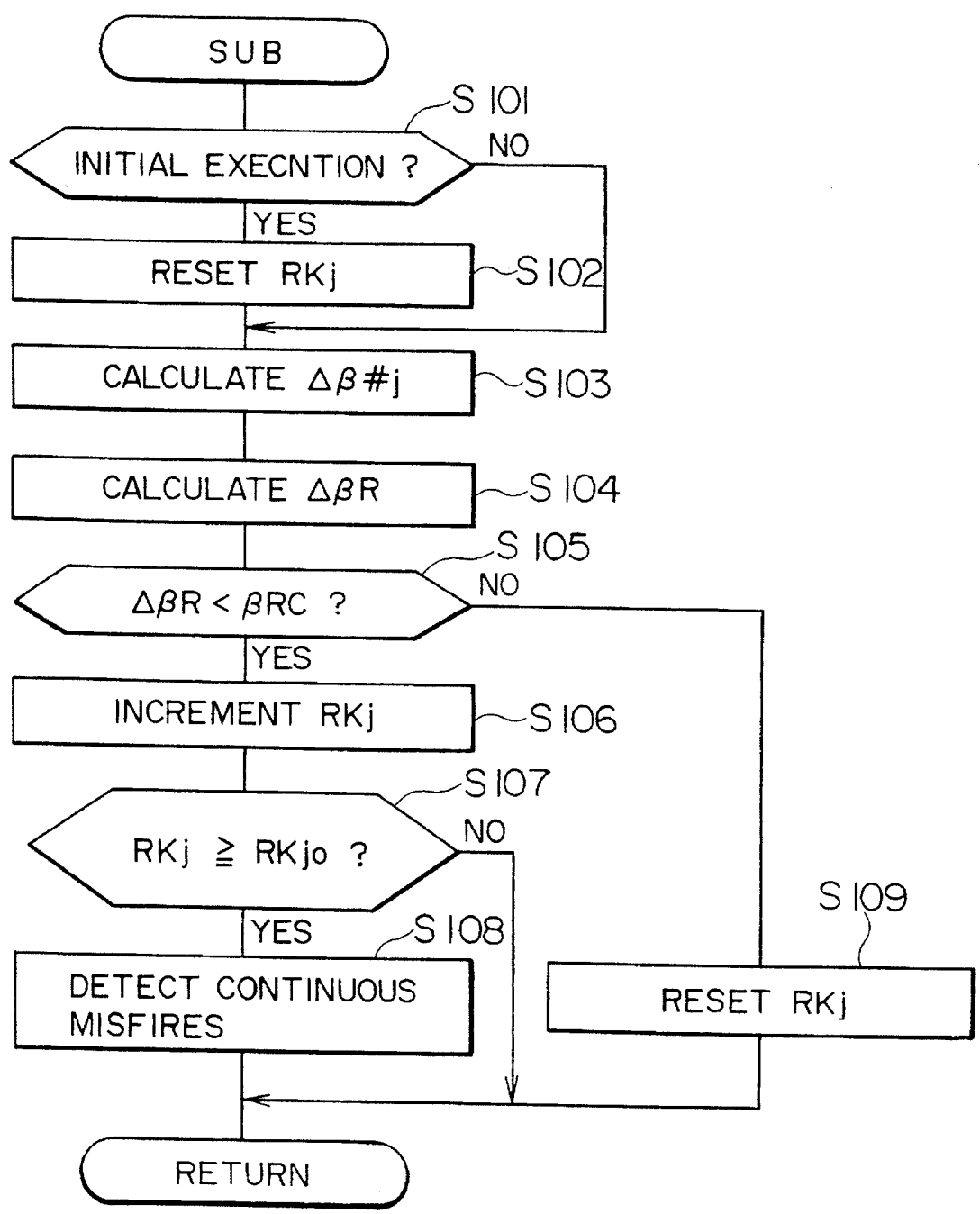
FIG. 7 is a flowchart showing the misfire judgment subroutine implementing step S12 of the procedure of FIG. 5.

Next at step S12, the cylinder identification variable N is referenced and the angular acceleration β calculated at step S11 is stored in one of the variables β#1, β#2, β#3 and β#4 within the memory 10 which is determined from the current cylinder identification variable N. Thereafter, the misfire judgment subroutine of FIG. 7 is executed. As described above it is assumed that the cylinder Nos. 1, 3, 4, 2 are ignited cyclically in that order. The variables β#1, β#2, β#3, β#4 holds the angular acceleration βcorrespond to predetermined phase intervals (i.e., predetermined crank angle intervals before the top dead center between the compression and the expansion stroke) of cylinder Nos. 1, 3, 4, 2, respectively.

Next at step S13, the variables Ti-1, TLi-1 and TRi-1 are updated as described above (Ti-1=Ti, TLi-1=TLi and TRi-1=TRi). Thus, each time the procedure of FIG. 5 is executed after the third execution cycle thereof, the variables β#1 through β#4 are successively stored and updated.

FIG. 3d shows the angular acceleration β (1/s$^2$) corresponding to respective cylinder Nos. 1 through 4 as determined by the procedure of FIGS. 5 and 6. The angular acceleration β rises above the reference level β=5 (1/s$^2$) in correspondence with the occurrence of misfire of cylinder No. 1 in the neighborhood of 1080 degrees of the crank angle. Thus if an occurrence of misfire is detected when the angular acceleration β exceeds the reference level, an occurrence of misfire of cylinder No. 1 can be detected.

According to this invention, however, the angular acceleration β is not compared directly with a reference level for the purpose of detecting occurrences of misfire. According to this invention, the continuous misfires of cylinders are detected as described below.

The difference Δβ of the angular accelerations β over two successively ignited cylinders (e.g., cylinder Nos. 1 and 3) corresponding to cylinder identification numbers is calculated by the following equation:

$$\Delta\beta\#j=\beta\#j-1-\beta\#j \quad (11)$$

where β#j represents the angular acceleration β stored in the variable β#j (j=1, 2, 3, 4) corresponding to the current value of the cylinder identification variable N, and β#j−1 is the angular acceleration β stored in the variable β#j−1. Thus, if j=2 (corresponding to cylinder No. 3), the variable β#j−1 represents the acceleration β corresponding to cylinder No. 1. If j=1 (cylinder No. 1), β#j−1 is interpreted to represent the variable β#4 (cylinder No. 2).

Figure 8A:
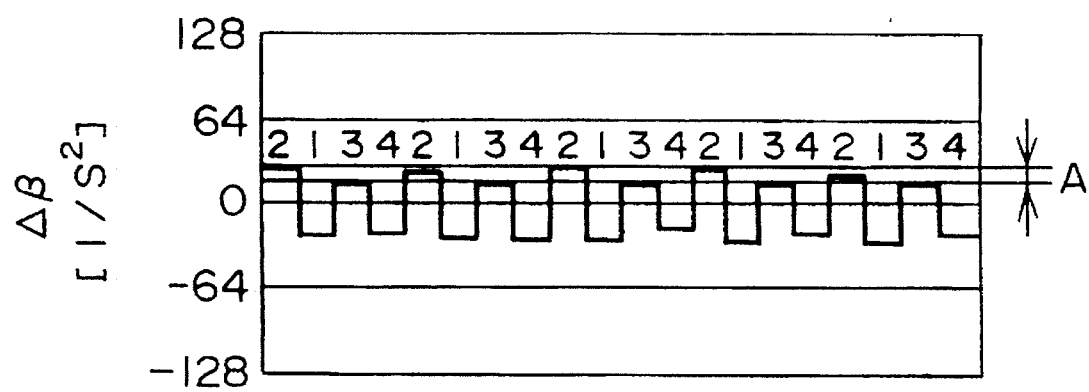
FIG. 8a is a diagram showing the variation of Δβ in the case where the combustion in the respective cylinders of the engine is normal.
Figure 8B:
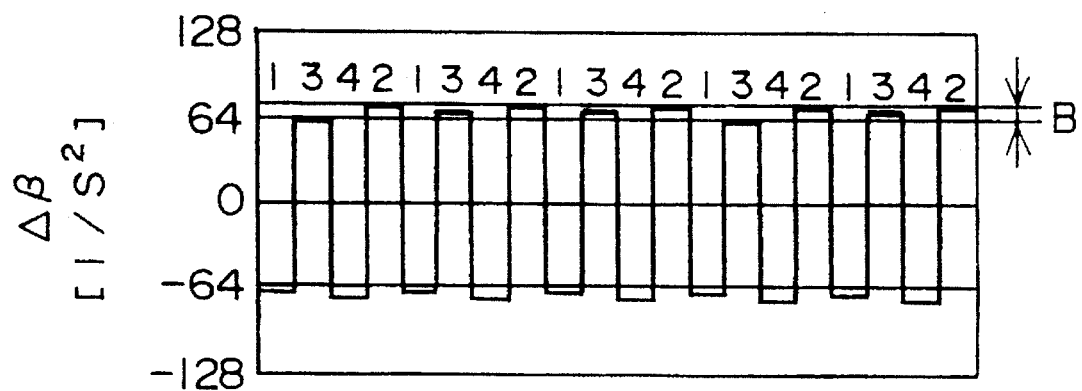
FIG. 8b is a diagram showing the variation of Δβ in the case where the cylinders corresponding to the same segment of the rotor of the crank angle sensor 6 (the cylinder Nos. 2 and 3, whose ignition timings are separated by 360 degrees of the crank angle) are continuously misfiring.

FIG. 8a is a diagram showing the variation of Δβ in the case where the combustion in the respective cylinders of the engine is normal. FIG. 8b is a diagram showing the variation of Δβ in the case where the cylinders corresponding to the same segment of the rotor of the crank angle sensor 6 (the cylinder Nos. 2 and 3, whose ignition timings are separated by 360 degrees of the crank angle) are continuously misfiring. The figures show difference of acceleration Δβ calculated by the above equation (11), from the results obtained under the condition of 2000 rpm and the charging efficiency at 0.625. In FIGS. 8a and 8b, the cylinder numbers corresponding to the cylinder identification number j are indicated upon respective levels of Δβ#j. Further, the variance among the levels of the Δβ corresponding to cylinders Nos. 2 and 3 (which correspond to the same segment of the rotor of the crank angle sensor 6 as described above, and whose ignition timings are separated by a predetermined crank angle, 360 degrees) is indicated by A in FIG. 8a and by B in FIG. 8b.

The cylinder Nos. 1, 3, 4 and 2 are ignited cyclically in that order. The cylinder Nos. 1 and 4 and Nos. 2 and 3 are ignited at a predetermined phase difference of 360 degrees in the crank angle. Even when the combustion is normal as shown in FIG. 8a, the difference of acceleration Δβ varies periodically and takes negative values at cylinder Nos. 1 and 4, and positive values at cylinder Nos. 2 and 3. When the cylinder Nos. 2 and 3 are misfiring as shown in FIG. 8b, no torque is supplied by the explosion of the cylinder Nos. 2 and 3. Thus the amplitude of the periodical variation substantially increases and the difference of acceleration Δβ rises to about +64 at cylinder Nos. 2 and 3, and falls to about −64 at cylinder Nos. 1 and 4.

However, the variance A among the levels of Δβ at cylinder Nos. 2 and 3 during the normal combustion is substantially greater than the variance B among the same levels of Δβ during continuous misfires of the cylinder Nos. 2 and 3. Namely, when the combustion is normal, there exists some variance in the combustion in the respective cylinders. Thus, in the case shown in FIG. 8a, a substantial variance A is developed in the levels of the difference of acceleration Δβ at cylinder Nos. 2 and 3. When, however, the cylinder Nos. 2 and 3 are continuously and completely misfiring such that no combustion takes place in these cylinders, there is no substantial cause for developing the variance B in the levels of the difference of acceleration Δβ at cylinder Nos. 2 and 3. As a result, the variance B of the levels of the difference of acceleration Δβ at cylinder Nos. 2 and 3 is reduced.

Thus, according to this embodiment, the absolute value of the variance in the levels of the difference of acceleration Δβ at cylinders ignited by a phase difference of 360 degrees in crank angle (e.g., cylinder Nos. 2 and 3) is calculated by the following equation:

$$\Delta\beta R=|\Delta\beta\#j-\Delta\beta\#j-2| \quad (12)$$

where $$\Delta\beta\#j=\beta\#j-1-\beta\#j$$

and the cylinder identification number j=1, 2, 3, 4 corresponds to cylinder Nos. 1, 3, 4, 2, respectively. The cylinder identification number j−2 represents a cylinder ignited two ignition periods earlier than the cylinder represented by the identification number j. Thus, if j=3 (corresponding to cylinder No. 4), j−2 corresponds to cylinder No. 1. If j=2 (corresponding to cylinder No. 3), j−2 corresponds to cylinder No. 2. If j=1 (corresponding to cylinder No. 1), j−2 corresponds to cylinder No. 4.

The absolute variance ΔβR as calculated by equation (12) is compared with a misfire judgment reference level βRC for the purpose of detecting an occurrence of continuous misfires. If the absolute variance ΔβR is less than the reference level βRC continuously for a predetermined number of times for the same cylinder, an occurrence of continuous misfires is detected.

FIG. 7 is a flowchart showing the misfire judgment subroutine implementing step S12 of the procedure of FIG. 5. At step S101, it is judged whether or not the current execution cycle is the initial or first execution of the subroutine of FIG. 7. If the judgment is affirmative at step S101, the execution proceeds to step S102, where the counter RKj for storing the number of judgments performed for the cylinder corresponding to cylinder identification number j is reset. If the judgment is negative at step S101, the execution proceeds directly to step S103.

Next at step S103, the difference of acceleration Δβ#j is calculated in accordance with the above equation (11) and is stored in the variable Δβ#j in the memory 10. Further, at step S104, the values stored in the variables Δβ#j and Δβ#j−2 are read out from the memory 10 and the absolute value ΔβR of the variance (difference) between the levels of difference of acceleration at cylinders whose ignition timings are separated by a predetermined phase difference of 360 degrees is calculated in accordance with the above equation (12).

Further at step S105, it is judged whether or not the absolute value ΔβR is less than a predetermined reference level βRC:

$$\Delta\beta R < \beta RC \qquad (13)$$

If the judgment is affirmative at step S105 (i.e., ΔβR<βRC), the execution proceeds to step S106, where the counter RKj is incremented by one (RKj=RKj+1). Further, at step S107, it is judged whether or not the value in the counter RKj is above a predetermined reference level:

$$RKj \leq RKj0$$

If the judgment is affirmative at step S107 (i.e., RKj≦RKj0), the execution proceeds to step S108, where an occurrence of continuous misfires is determined and the execution is terminated. If the judgment is negative at step S107, the subroutine is immediately terminated.

If the judgment is negative at step S105, on the other hand, the execution proceeds to step S109, where the counter RKj is reset and the subroutine is terminated. After the termination of the subroutine of FIG. 7, the execution returns to the main procedure of FIG. 5.

In the case of the above embodiment, the continuous misfires have been detected using the difference of acceleration Δβ as determined by equation (11) as the combustion condition parameter for respective cylinders. However, the angular acceleration β itself or the time ratio TRi may be used as the combustion condition parameter instead. Furthermore, the misfire judgment reference level βRC may be varied in accordance with the operating condition of the engine. Namely, the reference level βRC may be given as a function of the rpm and the load of the engine, the value of the reference level βRC being determined by a two-dimensional map of the rpm and the parameter representing the load. Further, for the purpose of absorbing the variance among the characteristics of respective cylinders and the fuel, the values passed through a linear digital filter may be added to the values detected for respective cylinders. Still further, it is noted that this invention is applicable to engines whose number of cylinders is other than four.

What is claimed is:

1. A device for detecting continuous misfires of a multi-cylinder internal combustion engine, comprising:

crank angle detector means for detecting predetermined crank angles of said internal combustion engine corresponding to predetermined phase angles of a plurality of cylinders of said internal combustion engine;

timer means, coupled to said crank angle detector means, for determining lengths of time between said predetermined crank angles of said internal combustion engine;

angular acceleration detector means, coupled to said timer means, for determining angular acceleration of a crankshaft of said internal combustion engine over predetermined phase intervals of said plurality of cylinders;

an acceleration differential calculator for calculating an acceleration differential between an angular acceleration corresponding to each of said plurality of cylinders and a respective other one of said plurality of cylinders;

variance determining means, coupled to said acceleration differential calculator, for determining a variance of levels of said acceleration differential over ignition timings of two cylinders which are separated by a predetermined crank angle; and comparator means, coupled to said variance determining means, for comparing said variance with predetermined misfire judgment reference level, for detecting an occurrence of continuous misfires when said variance is less than said misfire judgment reference level.

2. A misfire detection device as claimed in claim 1, wherein said misfire judgment reference level is varied according to operating conditions of said engine.

3. A misfire detection device as claimed in claim 1, wherein said predetermined crank angle is 360 degrees of crank angle.

4. A misfire detection device as claimed in claim 1, wherein said comparator means compares said variance with said predetermined misfire judgment reference level for a predetermined number of times, said comparator means detecting an occurrence of continuous misfires when said variance is continuously less than said misfire judgment reference level for said predetermined number of times.

5. A misfire detection device as claimed in claim 1, wherein said acceleration differential for each of said plurality of cylinders is calculated from a difference between said angular acceleration corresponding to said each cylinder and a cylinder ignited immediately prior to ignition of said each cylinder.

6. A device for detecting continuous misfires of a multi-cylinder internal combustion engine, comprising:

crank angle detector means for detecting predetermined crank angles of said internal combustion engine corresponding to predetermined phase angles of a plurality of cylinders of said internal combustion engine;

timer means, coupled to said crank angle detector means, for determining lengths of time between said predetermined crank angles of said internal combustion engine;

angular velocity detector means, coupled to said timer means, for determining angular velocity of a crankshaft of said internal combustion engine over predetermined phase intervals of said plurality of cylinders;

a velocity differential calculator for calculating a velocity differential between an angular velocity corresponding to each of said plurality of cylinders and a respective other one of said plurality of cylinders;

variance determining means, coupled to said differential calculator, for determining a variance of levels of said velocity differential over ignition timings of two cylinders which are separated by a predetermined crank angle; and comparator means, coupled to said variance determining means, for comparing said variance with predetermined misfire judgment reference level, for detecting an occurrence of continuous misfires when said variance is less than said misfire judgment reference level.

* * * * *